United States Patent [19]

Hamilton

[11] 4,116,579
[45] Sep. 26, 1978

[54] END MILL TOOL HOLDER BODY AND TOOL

[76] Inventor: Martin Norman Hamilton, Middle Rd., R.R. #4, Meadville, Pa. 16335

[21] Appl. No.: 717,643

[22] Filed: Aug. 25, 1976

[51] Int. Cl.² .......................... B23B 51/00; B26D 1/00
[52] U.S. Cl. .............................. 408/233; 408/239 A; 407/49; 407/56; 407/104; 407/108
[58] Field of Search .......................... 29/103 A, 105 R; 408/59, 233

[56] References Cited

U.S. PATENT DOCUMENTS

| 930,436 | 8/1909 | Thomas | 408/233 |
|---|---|---|---|
| 2,400,856 | 5/1946 | Thompson | 408/233 |

FOREIGN PATENT DOCUMENTS

| 2,236,592 | 7/1973 | France | 408/59 |
|---|---|---|---|
| 842,133 | 7/1960 | United Kingdom | 29/103 A |

Primary Examiner—Leonidas Vlachos
Attorney, Agent, or Firm—Charles L. Lovercheck

[57] ABSTRACT

An end mill tool holder body and a tool suitable for use in a boring mill or any other metal-cutting machine. The tool has a round body with shank to suit the machine tool and a flat, laterally-disposed surface at one end of the body terminating in a shoulder. An axial bore extends through the body and a draw bar in the bore has a pin which extends through an opening in a cutting insert and a nut on the other end of the draw bar clamps the cutting insert against the shoulder, holding it rigidly in position for milling or boring.

The inserts are of the throw-away type and are made of precision dimension so that the body and cutting insert can be used in a computerized operation.

10 Claims, 14 Drawing Figures

END MILL TOOL HOLDER BODY AND TOOL

GENERAL DESCRIPTION OF THE INVENTION

The tool and body disclosed herein are suitable for use in a vertical boring mill or any other metal-cutting machine wherein the cutting insert is of the throw-away type so that the machine can be set up and the insert replaced without upsetting the setup of the machine.

OBJECTS OF THE INVENTION

It is an object of the invention to provide an improved boring mill and milling machine tool.

Another object of the invention is to provide an improved tool holder and replaceable cutting insert.

Another object of the invention is to provide an improved tool holder which is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in form, size, proportions and minor details of construction without departing from the spirit or sacrificing any of the advantages of the invention.

GENERAL DESCRIPTION OF DRAWINGS

Figure 2:
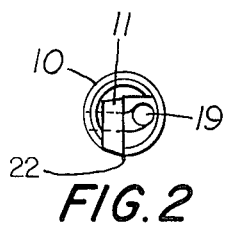
FIG. 2 is an end view of the tool holder and insert shown in FIG. 1.
Figure 1:
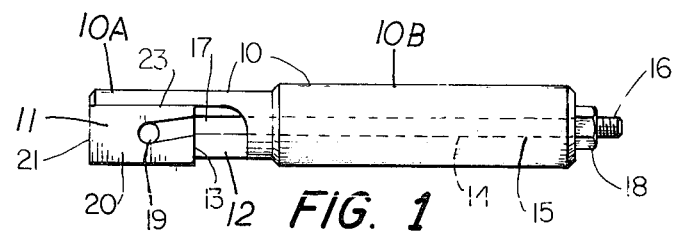
FIG. 1 is a side view of a tool holder and insert according to the invention.
Figures 3, 4:
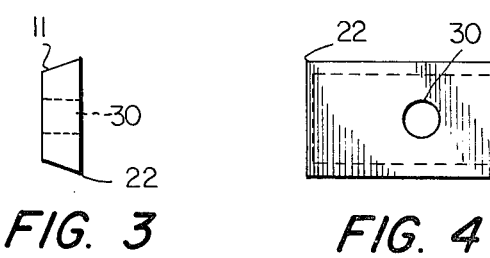
FIG. 3 is an end view of the insert shown in FIGS. 1 and 2.
FIG. 4 is a side view of the insert.

FIG. 4-A is a partial end view of the insert shown in FIG. 4.

Figure 5:
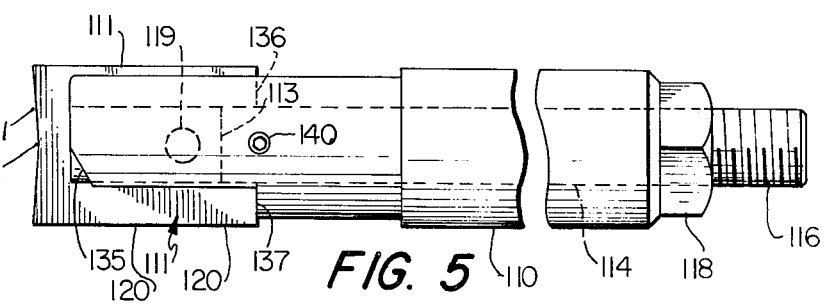

FIG. 5 is a side view of another embodiment of the invention of a tool holder and insert.

Figure 6:
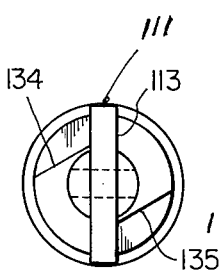

FIG. 6 is an end view of the embodiment shown in FIG. 5.

Figure 7:
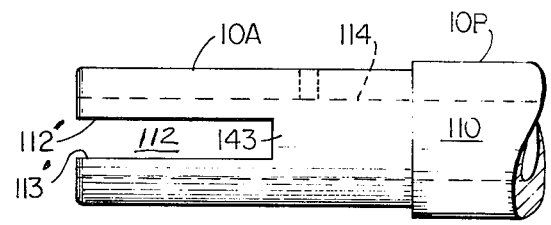

FIG. 7 is an enlarged side view of the body of the tool holder shown in FIG. 5.

Figure 8:
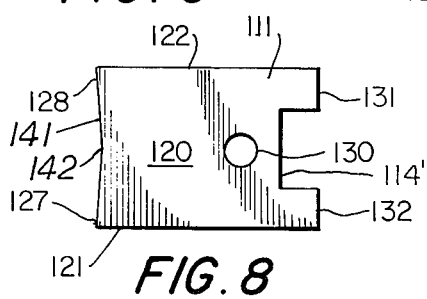

FIG. 8 is a side view of the insert shown in FIG. 5.

Figure 9:
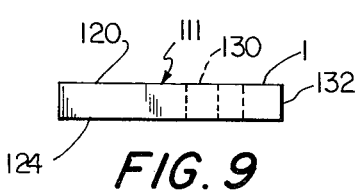

FIG. 9 is an edge view of the insert shown in FIG. 8.

Figure 10:
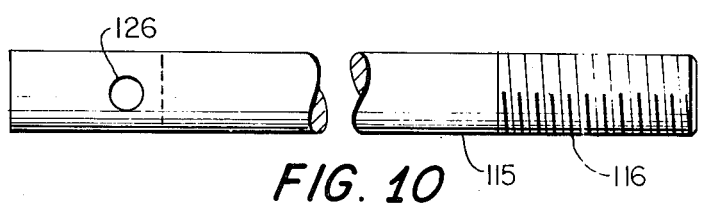
Figure 11:
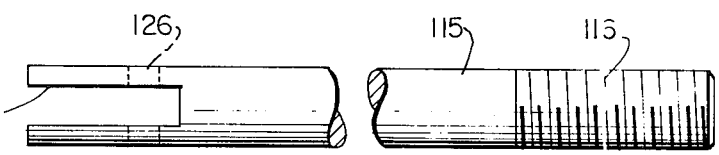

FIGS. 10 and 11 are views of the draw bar used in the embodiment of the invention shown in FIG. 5.

Figure 12:
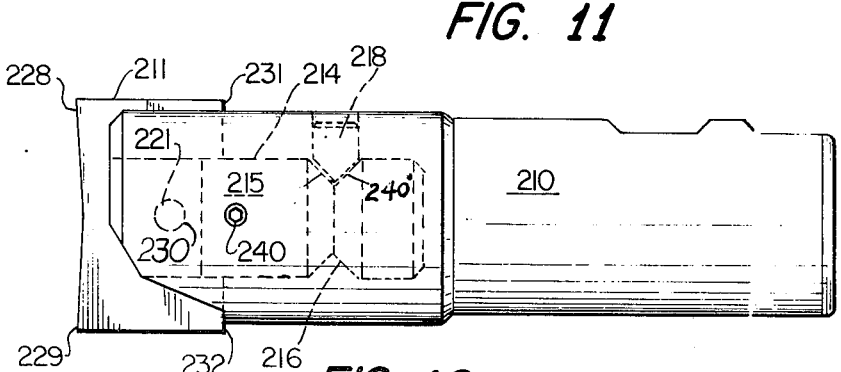

FIG. 12 is a side view of another embodiment 8 of the tool holder.

Figure 13:
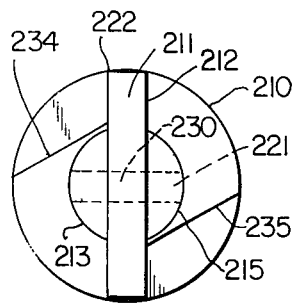

FIG. 13 is an end view of the embodiment in FIG. 12.

DETAILED DESCRIPTION OF DRAWINGS

Now, with more particular reference to the drawings, the combination body and insert is made up of the generally cylindrical body 10 which has insert 11 supported at one end. The body has a flattened surface 12 adjacent the end having the insert and one face of the insert rests on the flattened surface. The flattened surface terminates adjacent the enlarged part of the body 10 in a shoulder 13 which rests against an end of the insert 11. The flattened surface is generally perpendicular to the shoulder and the insert rests against it.

The insert is generally rectangular in shape and has two flat planar sides generally parallel to each other and a flat end that engages the shoulder 13. A longitudinally-extending bore 14 extends through the body and is offset from the center thereof and the draw bar 15 is slidably received in the bore. The draw bar 15 has a threaded end 16 which receives the nut 18. The end 17 has a pin 19 on it which extends perpendicular to the flat surface and extends up through the hole 30 in the insert 11.

Thus, when the nut 18 is tightened, the pin 19 draws the insert firmly against the shoulder 13 and holds it in place. When a force is exerted on the cutting end 21 of the insert or on the edge 22, the insert will be urged more firmly into engagement with the shoulder and against the lateral shoulder 23.

The body 10 may be of a precise diameter and the length of the enlarged part 10B of the body may be of precise length as well as the reduced size portion 10A, having the flattened surface 12, thereon. Thus, the tool can be used for computerized machines since inserts will be of predetermined size and will be held in precise position by draw bar 15 and may be replaced without changing the setting of the machine.

In the embodiment of the invention illustrated in FIGS. 5–11, another embodiment of the invention is shown wherein the tool holder has a generally cylindrical body 110 which supports an insert 111 on one end. The insert has two flat faces that are received in the slot 112 which has a first flat surface 112' and a second flat surface 113' and a bottom shoulder 143. The body has an axial bore 114 which receives the draw bar 115 which has a threaded end 116 that receives the nut 118. The draw bar 115 has a slot 123 which receives the insert 111. Insert 111 has a notch between clamping shoulders 131 and 132. This notch receives the end of draw bar 115 adjacent hole 126 and holds the insert firmly against lateral movement. The pin 119 extends through the opening 126 in the draw bar 115. The pin is of a length equivalent to the diameter of the draw bar 115 and, when the draw bar is pulled into the bore 114, with the insert 111 in slot 123 and the pin 119 in place, the pin is trapped in the bore 114 and cannot fall out of the insert.

The insert has a notch 114' and two parallel sides 120 and 124 and side cutting edges 121 and 122, and end cutting edges 127 and 128. Draw bar 115 pulls insert 111 back, clamping surfaces 131 and 132 of the insert against the shoulders 136 and 137 at either side of slot 112 in body 110. The end of the body is flattened at 134 and 135 forming surfaces disposed at approximately 45° to a side 113 of slot 112.

It will be seen that the surface 141 on the distal end of inserts incline outwardly from the center 142 of the end of the insert. This reverse lead at center makes possible the boring into most solid materials.

Now, with regard to the embodiment of the invention shown in FIGS. 12 and 13, the tool has a body 210 with an insert 211 similar to the insert 11 shown in the embodiment of FIGS. 5–11. The body has a slot 212 which receives the insert 211 and the shoulder 231 and 232 rest on the ends of the slot. A wide hole 214 is formed in the body of the draw bar 215 is received in the hole 214. The draw bar has a slot similar to the slot 123 on FIG. 11 which receives the pin 221 which likewise extends through the hole 230 in the insert. The draw bar 215 has a V-shaped groove 216 and the set screw is threadably received in a threaded hole offset from the center of the groove in the body and has a conical point which engages the side 240' of the groove 216 remote from the insert 211 holding the insert 211 rigidly against the shoulder of the body. This body like the others shown, can be inserted into a boring machine or any other metal cutting machine. The insert 211 has cutting edges 228 and 229 similar to the cutting edges on the insert shown in FIGS. 8 and 9.

The foregoing specification sets forth the invention in its preferred, practical forms but the structure shown is capable of modification with a range of equivalents without departing from the invention which is to be understood is broadly novel as is commensurate with the appended claims.

The embodiments of the invention in which an exclusive property or privilege is claimed are defined as follows:

1. In combination, a tool holder body (110), a draw bar (115), and a cutting insert (111) comprising,
   an elongated generally cylindrical body (110) having a laterally and longitudinally extending slot (112) in one end thereof,
   said slot (112) being defined by two flat surfaces (112', 113') extending generally parallel to the central axis of said cylindrical body,
   an axial cylindrical bore (114) of substantially uniform size in said body generally coaxial to the central axis of said cylindrical body (110) and extending parallel to the sides of said slot (112),
   said slot (112) terminating in flat shoulders (136, 137) disposed generally perpendicular to said central axis of said cylindrical body and one said shoulder (136, 137) being disposed at each side of said cylindrical bore (114),
   said insert (111) being generally rectangular in shape and having flat planar side surfaces (120, 124) resting on said flat surfaces (112', 113'),
   a notch (114') in one end of said insert,
   said notch (114') registering with an end of said cylindrical bore (114) and one flat end surface (131, 132) on said insert at each side of said notch resting on said shoulders (136, 137) on said body (110) at each side of said bore,
   said notch (114') in said insert having a width equal to the diameter of said bore through said body,
   a draw bar (115),
   said draw bar (115) having a diameter substantially equal to the diameter of said axial cylindrical bore (114) in said body and having a slot (123) in one end,
   said slot (123) in said draw bar having flat side surfaces generally co-planar with and resting on said flat side surfaces of said insert (111),
   said slot (123) in said draw bar receiving said insert,
   the side edges of said notch (114') in said insert (111) engaging the side edges of said draw bar (115) holding said insert (111) against lateral movement,
   a laterally extending hole in said draw bar (115) and a hole (130) in said insert and a pin (119) extending through said hole in said draw bar and through said hole in said insert holding said insert to said draw bar,
   retaining means on said draw bar engaging said body urging said draw bar to draw said surfaces at the sides of of said notch (114') in said insert against said shoulders (136, 137) on said body whereby said insert (111) is held in rigid clamped relation to said body (110).

2. The combination recited in claim 1 wherein said insert extends beyond the side of two said side edges and an end of said body providing said end cutting edge and said side cutting edge and providing a second side cutting edge opposite said first mentioned side cutting edge for boring holes.

3. The combination recited in claim 1 wherein said end of said body adjacent said slot therein has two flattened surfaces parallel to each other and disposed at approximately 45 degrees to said slot in said body.

4. The combination recited in claim 3 wherein the end of said body having said slot therein is generally cylindrical and has a smaller diameter than the end remote from said slot in said body.

5. The tool holder body and cutting tool recited in claim 1 wherein said retaining means comprises,
   threaded means on the end of said draw bar remote from said slot and a nut on said threaded means for retaining said tool in said bore.

6. The tool recited in claim 1 wherein said retaining means comprises,
   a circumferential groove in said draw bar and a set screw threadably received in radially-extending hole in said body,
   said set screw having a conical point received in said circumferential groove.

7. The tool recited in claim 1 wherein a set screw is threadably received in said body adjacent the second end of said body clamping said draw bar laterally against one side of said body.

8. The tool recited in claim 7 wherein said set screw has a conical point threadably engaging a V-shaped groove in said draw bar.

9. The tool recited in claim 8 wherein a second set screw is received in a hole, disposed perpendicular to said first hole in said body clamping said draw bar laterally relative to said first mentioned set screw.

10. The tool recited in claim 8 wherein said set screw is offset from the center of said groove in a direction away from said insert whereby said set screw point engages said groove on the side thereof remote from said insert.

* * * * *